United States Patent
Song et al.

(10) Patent No.: US 9,685,848 B2
(45) Date of Patent: *Jun. 20, 2017

(54) VIBRATING UNITS

(75) Inventors: Wenbin Song, Pomona, CA (US); Orsi R. Garcia, Bell Gardens, CA (US)

(73) Assignee: Inseat Solutions, LLC, Santa Fe Springs, CA (US)

( * ) Notice: Subject to any disclaimer, the term of this patent is extended or adjusted under 35 U.S.C. 154(b) by 526 days.

This patent is subject to a terminal disclaimer.

(21) Appl. No.: 13/292,240

(22) Filed: Nov. 9, 2011

(65) Prior Publication Data

US 2012/0184883 A1    Jul. 19, 2012

Related U.S. Application Data

(60) Provisional application No. 61/412,318, filed on Nov. 10, 2010.

(51) Int. Cl.
*A61H 23/02* (2006.01)
*H02K 33/16* (2006.01)
*H02K 9/22* (2006.01)

(52) U.S. Cl.
CPC ............ *H02K 33/16* (2013.01); *A61H 23/02* (2013.01); *H02K 9/22* (2013.01)

(58) Field of Classification Search
CPC ........................... A61H 23/02; A61H 23/0218
USPC ........ 601/46, 49, 78–81; 310/15, 16, 23, 25, 310/36
See application file for complete search history.

(56) References Cited

U.S. PATENT DOCUMENTS

| | | | |
|---|---|---|---|
| 4,157,088 A | 6/1979 | Gracey | |
| 5,424,592 A * | 6/1995 | Bluen et al. | 310/28 |
| 6,232,680 B1 * | 5/2001 | Bae et al. | 310/17 |
| 6,290,661 B1 | 9/2001 | Cutler et al. | |
| 7,121,647 B2 * | 10/2006 | Kaneda et al. | 381/396 |
| 7,798,982 B2 * | 9/2010 | Zets et al. | 601/78 |
| 2003/0025366 A1 | 2/2003 | Barreiro | |
| 2003/0139693 A1 | 7/2003 | Swift | |
| 2006/0220473 A1 * | 10/2006 | Ueda | 310/12 |
| 2007/0164616 A1 * | 7/2007 | Kuwabara et al. | 310/15 |
| 2008/0071200 A1 | 3/2008 | Rawls-Meehan | |
| 2008/0183113 A1 | 7/2008 | Kazerounian et al. | |
| 2008/0214969 A1 | 9/2008 | Milne et al. | |
| 2009/0193590 A1 | 8/2009 | Hata | |
| 2010/0320819 A1 | 12/2010 | Cohen et al. | |

(Continued)

FOREIGN PATENT DOCUMENTS

JP          09-205763     *  8/1997   ............. H02K 33/02

OTHER PUBLICATIONS

Information about Related Patents and Patent Applications, see section 6 of the accompanying Information Disclosure Statement Letter, which concerns Related Patents and Patent Applications.

*Primary Examiner* — Justine Yu
*Assistant Examiner* — Kathrynn Lyddane
(74) *Attorney, Agent, or Firm* — Stefan J. Kirchanski; Zuber Lawler & Del Duca LLP

(57) ABSTRACT

A vibrating device includes a motor housing, an electromagnetic coil coupled to the motor housing and a motor elastically coupled to the motor housing. The motor includes a pole plate, a magnet and a yoke, the pole plate bonded to the magnet and the magnet set within the yoke. The electromagnetic coil is disposed within an annular space defined between the magnet and the yoke.

12 Claims, 10 Drawing Sheets

(56) References Cited

U.S. PATENT DOCUMENTS

2012/0138067 A1 6/2012 Rawls-Meehan
2012/0209157 A1 8/2012 Racine

* cited by examiner

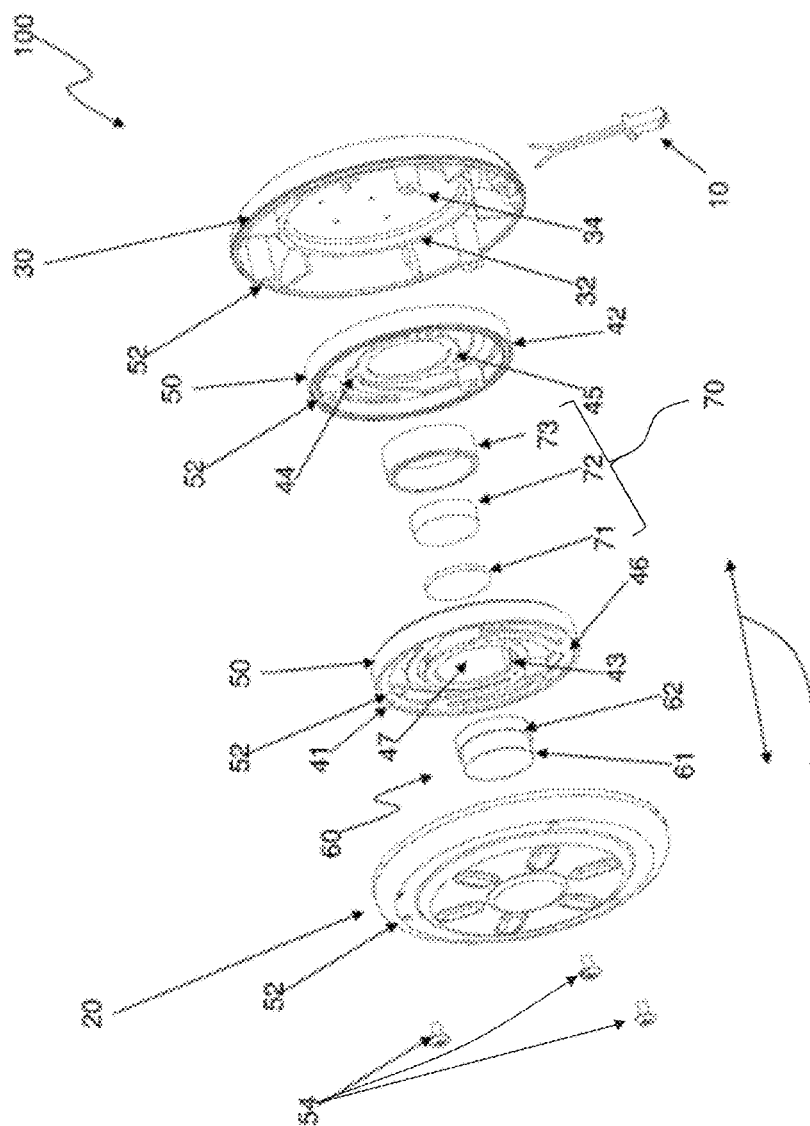

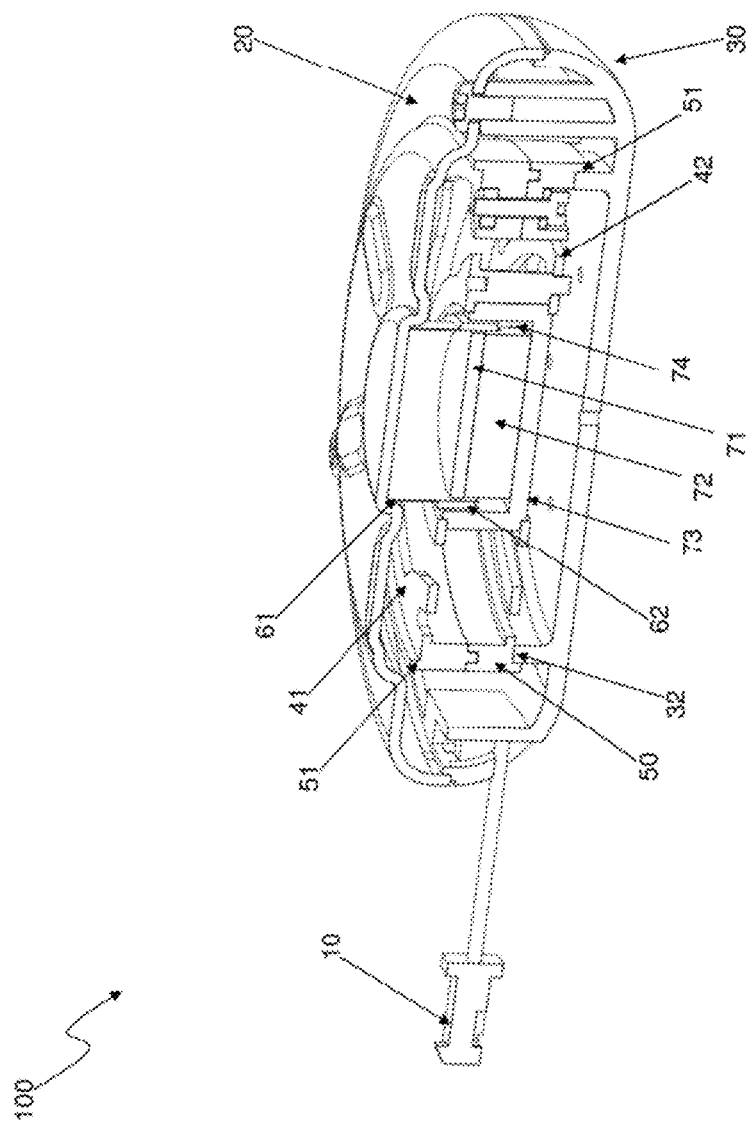

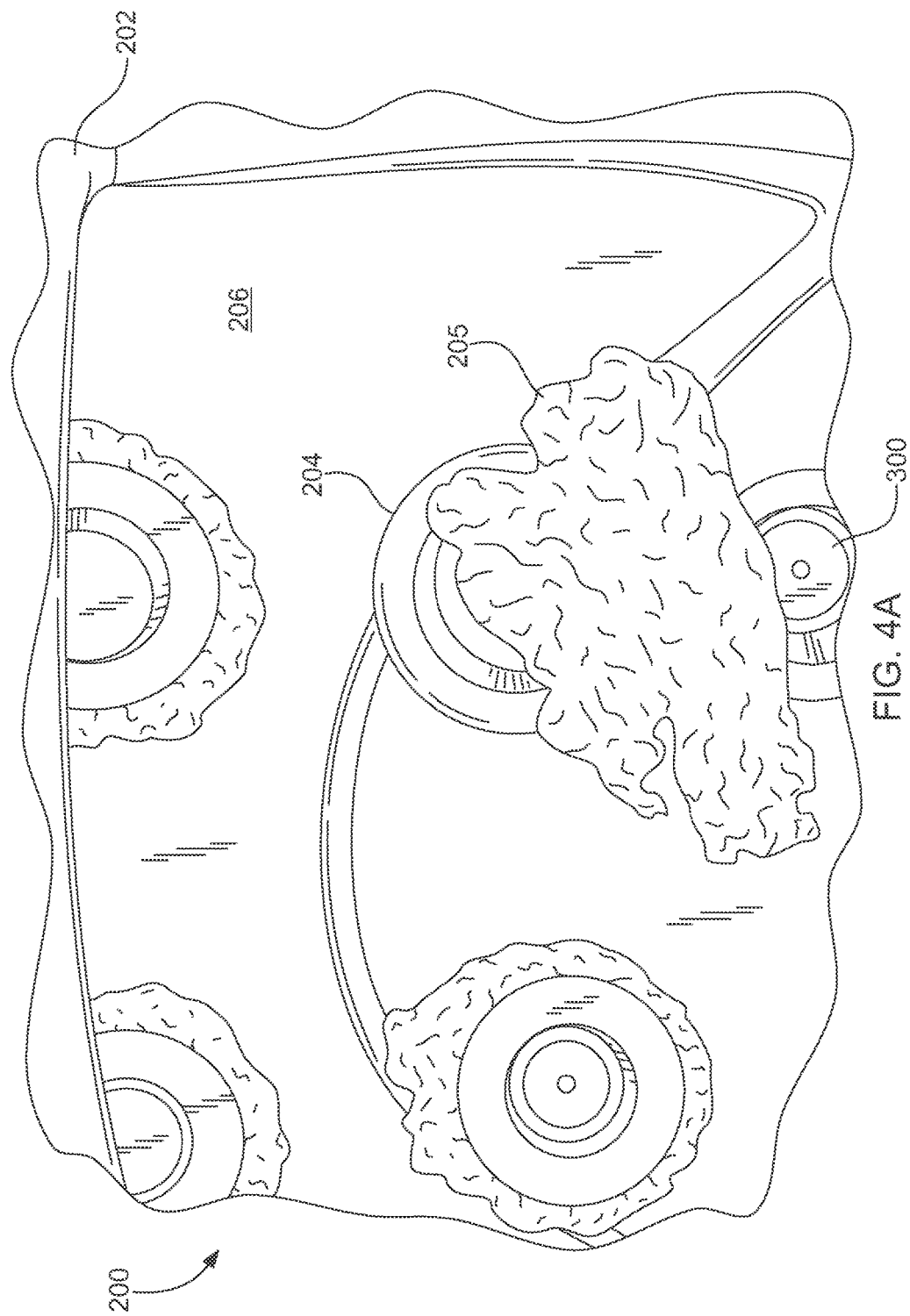

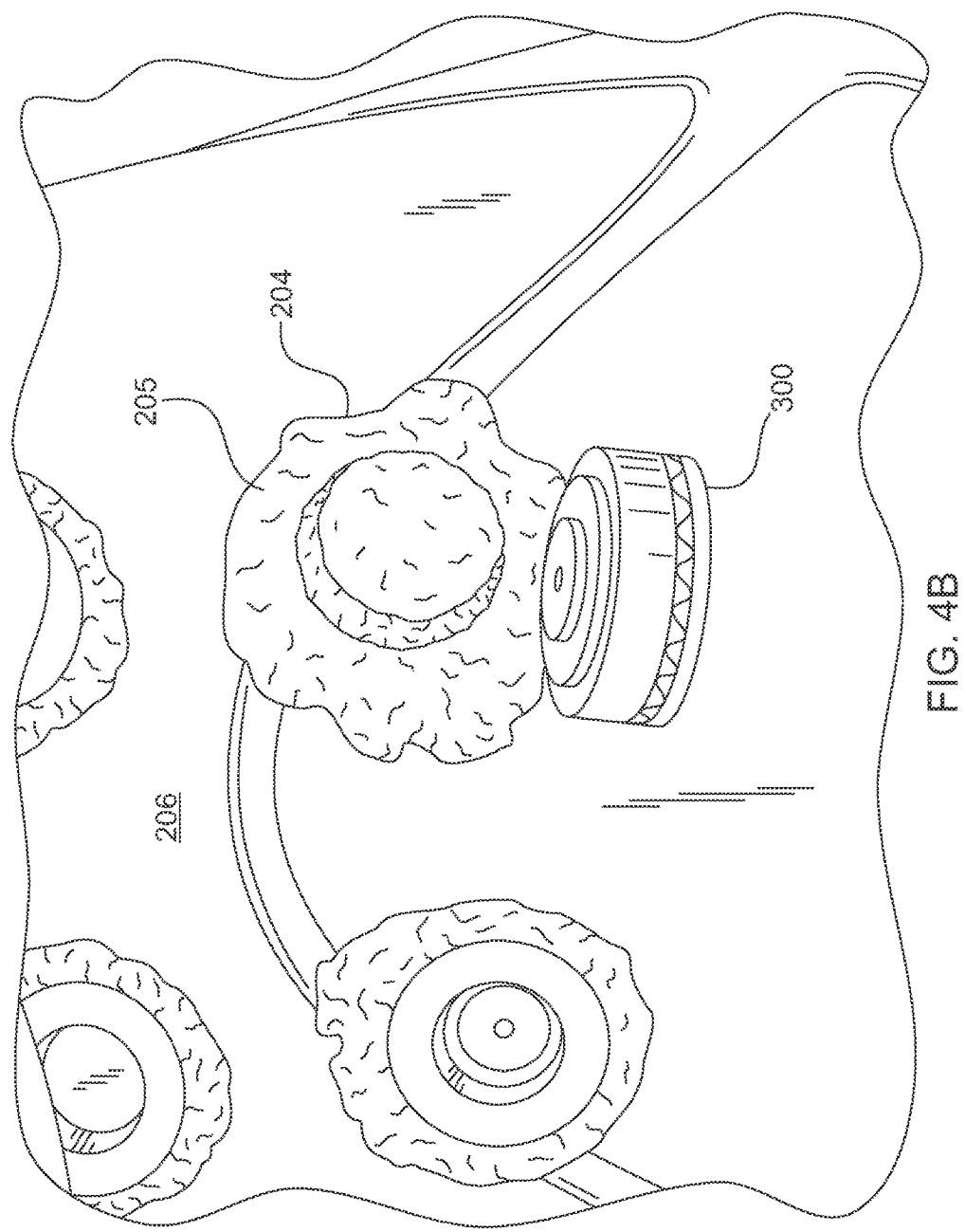

VIBRATING UNITS

CROSS-REFERENCE TO RELATED APPLICATION

This application claims the benefit under 35 U.S.C. §119(e) of U.S. Provisional Application No. 61/412,318, filed Nov. 10, 2010, the contents of which is incorporated by reference herein in its entirety.

FIELD OF THE INVENTION

The embodiments disclosed herein relate generally to vibrating devices. More particularly, the disclosed embodiments are directed to vibrating units that are suitable for use in demanding or highly-regulated fields, such as automobiles, hospitals, airplanes, etc., where the requirements of low power, high efficiency, and little electromagnetic interference are called for. Embodiments of the disclosed inventive concepts can include devices that may be used in a chair, cushion or other applications that require safe vibration for massage, alerting or entertainment purposes.

BACKGROUND OF THE INVENTION

Vibrating units are widely employed in devices associated with numerous industries, particularly in consumer electronics, such as cellular telephones, gaming equipments, toys, clocks, massage equipment, etc. A typical vibrating unit can comprise an electric motor configured to rapidly spin an off-center weight. Such vibrating units typically generate undesirable, powerful radio signals in a wide frequency band, potentially leading to electromagnetic interference with other nearby electrical and electronic equipment. These vibrating units are also relatively heavy, and have low power efficiencies. A typical vibration unit may not be suitable for certain applications and environments, such as laboratories, hospitals, aircraft, etc., that have restrictions on power consumption, electromagnetic interference, and noise output.

SUMMARY OF THE INVENTION

A preferred embodiment of a vibrating device includes a housing, an electromagnetic coil mechanically and thermally coupled to the housing and a motor elastically coupled to the housing. The electromagnetic coil is situated with respect to the motor to electromagnetically couple with the motor to cause the motor to vibrate within the housing. The housing provides a means for mounting the device on surrounding structure, and for transferring the vibrations generated by the device to the surrounding structure.

The housing is formed at least in part from a thermally-conductive material that, along with the electromagnetic coil, form a thermal circuit that conducts heat out of the vibrating device, thereby dissipating heat generated within the housing during operation of the device. Moreover, the housing can have apertures formed therein that permit air to be pumped into and out of the housing in response to the movement of the motor within the housing. The pumping action further dissipates the heat generated within the housing, and the acoustic pulses resulting from the pumping action can increase the level of vibration generated by the device, and can permit the device to operate at higher power levels than otherwise would be possible.

In preferred embodiments a suspension system is coupled to the housing, and the motor is coupled to the suspension system. The suspension system is preferably a spider that has an internal region elastically coupled to an external region; the external region is coupled to the housing and the motor is coupled to the internal region. In specific embodiments the suspension system has two spiders, and the motor is sandwiched between the internal regions of the spiders. The internal regions of the spiders may be coupled together with standoff connectors.

In various embodiments the motor comprises a pole plate, a magnet and a yoke. The pole plate is coupled to the magnet, and the magnet is disposed within the yoke, thereby defining a space between the magnet and the yoke. The electromagnetic coil is disposed within this space and hence the motor rides around the electromagnetic coil.

BRIEF DESCRIPTION OF THE DRAWINGS

FIG. 1A is an exploded perspective view of an embodiment of a vibrating unit;

FIG. 1B is a perspective cross-sectional view of the unit shown in FIG. 1A;

FIGS. 4A-4E show installation of an embodiment of a vibrating unit into a chair.

DETAILED DESCRIPTION

Figure 1C:
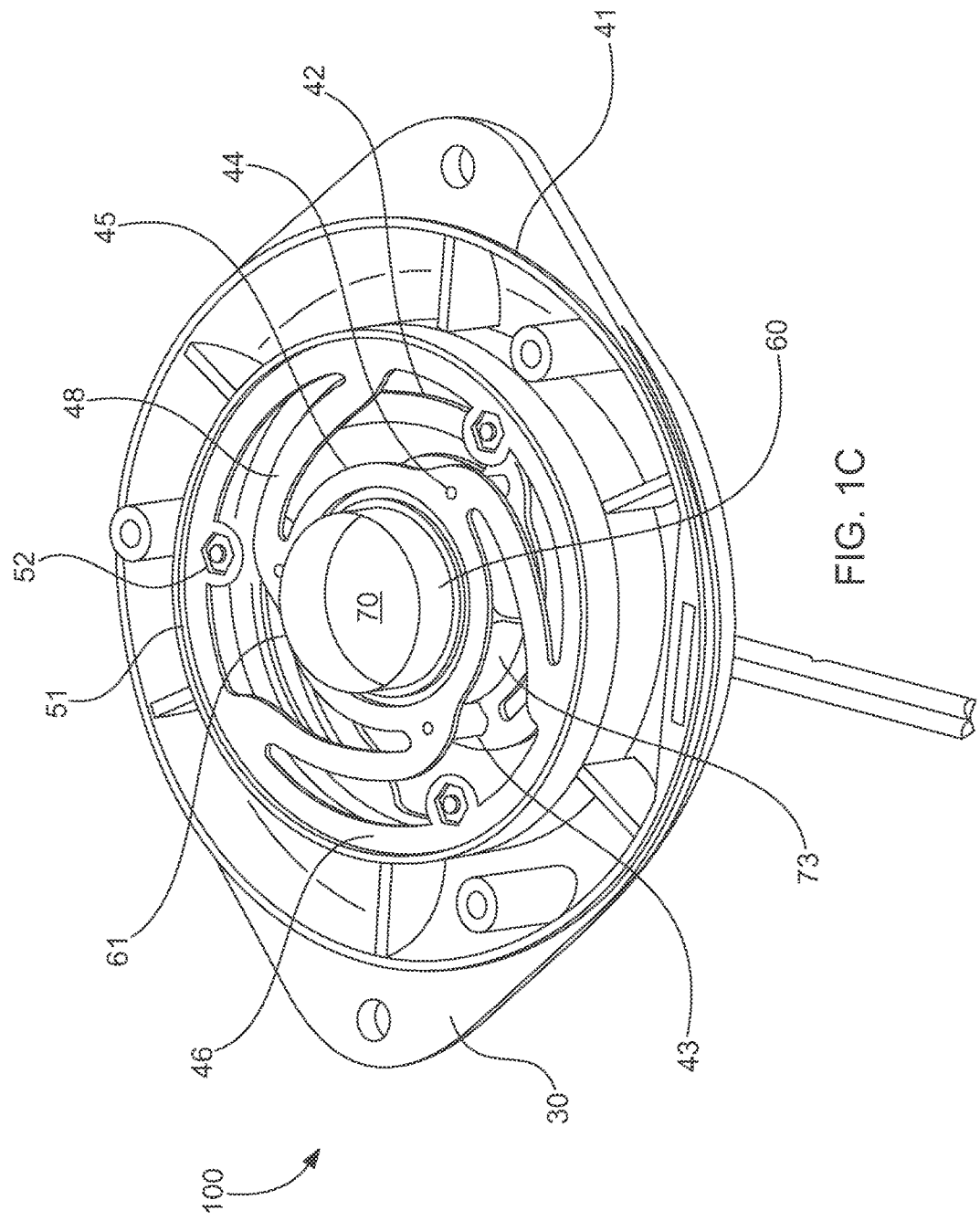
FIG. 1C is a perspective view of the unit shown in FIG. 1A without a back cover.

FIG. 1A is an exploded perspective view of an embodiment of a vibrating unit 100. FIG. 1B is a perspective cross-sectional view of the unit 100. FIG. 1C is a perspective view of the unit 100 without a back cover. In preferred embodiments the unit 100 is about 3 inches in length and about 1 inch in thickness. Alternative embodiments of the unit 100 can have other dimensions. The unit 100 comprises a terminal 10, a thermally conductive back cover 20, a front cover 30, a first spider 41, a second spider 42, spider mounts 50, a plurality of stand-off connectors 43, an electromagnetic coil 60, a pole plate 71, a magnet 72 and a yoke 73. The back cover 20 can be formed, for example, from aluminum material having a thermal conductivity of approximately 237 Watts/(meter-Kelvin). Together, the covers 20, 30 form a housing that encloses the majority of the other components of the device 100. As discussed in the following, adhesives or any other suitable methods may be used to mechanically couple the various components together; for purposes of the following discussion a combination of adhesives and screws or the like are used, but it will be appreciated that other means may be used to hold the various components together. The term "coupled," as used herein, is intended to denote both direct and indirect connections between two or more parts or components.

Figure 2:
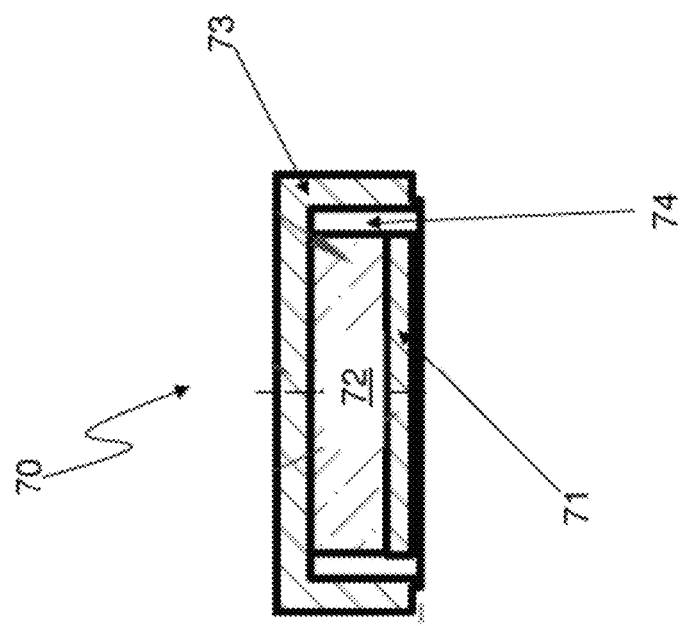
FIG. 2 is a side view of an embodiment of a motor assembly of the unit shown in FIGS. 1A-1C.

The pole plate 71, magnet 72, and yoke 73 form a motor 70 for the device 100. A side view of the motor 70 is shown in FIG. 2. The pole plate 71 is disposed on top of the magnet 72, and the combination is then disposed in a tubular space of the yoke 73, thereby forming an annular space 74. The width of the annular space 74 is greater than the thickness of the front portion 62 of the magnetic coil 60. Thus, the front portion 62 of the magnetic coil 60 may ride within the annular space 74. The components 71, 72, 73 of the motor 70 may be adhered together using a suitable adhesive. Other suitable means for coupling the components 71, 72, 73 can be used in the alternative. The pole plate 71 substantially limits the magnetic flux in the side directions, and tightly constrains the magnetic loops. Consequently, stray magnetic flux is kept to a minimum. The pole plate 71 may be made, for example, from 1010 steel with a zinc plate coating. The magnet 72 may be, for example, a neodymium-iron-boron magnet with a nickel plate coating. The yoke 73 may be made, for example, from 1010 steel with a zinc plate coating.

Figure 3:
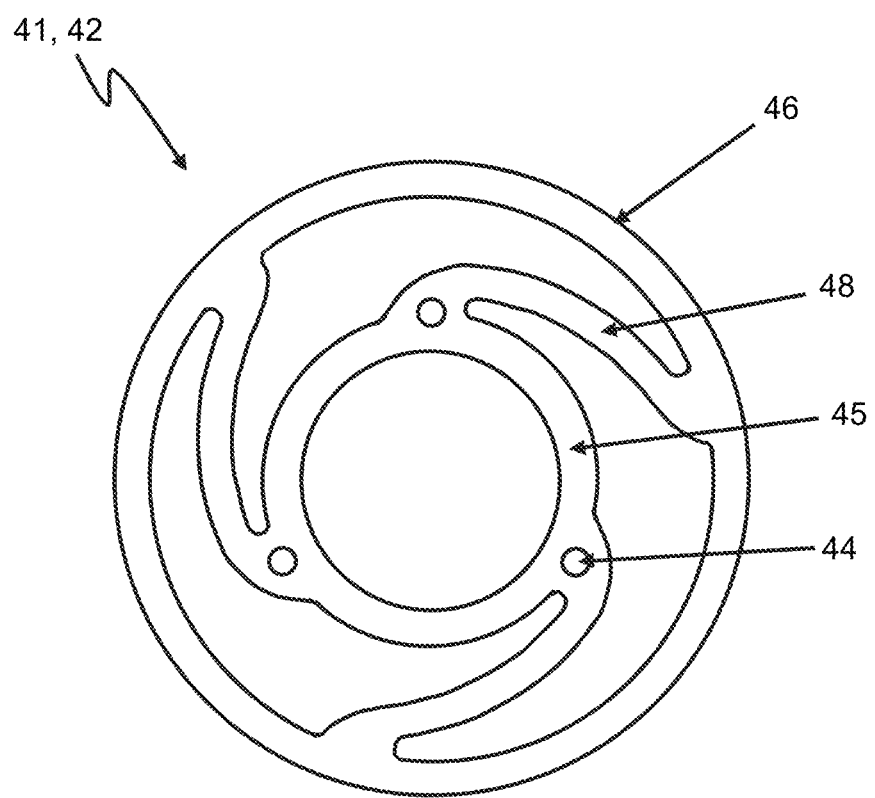
FIG. 3 is a top plan view of an embodiment of a spider of the unit shown in FIGS. 1A-1C.

As further illustrated in FIG. 3, which is a top view of spiders 41, 42, each spider 41, 42 comprises an aperture 44 for coupling the spider 41, 42 to an end of a corresponding stand-off connector 43. Three stand-off connectors 43 are employed, at 120 degree angles to each other with respect to the top view of the spider 41, 42. More, or less than three stand-off connectors 43 can be used in alternative embodiments. The stand-off connectors 43 may be screwed onto the spiders 41, 42. The stand-off connectors 43 thus mechanically couple the spiders 41, 42 together, but keep a predefined distance between the spiders 41, 42, which may be the height of the yoke 73 or slightly greater. The spiders 41, 42 have internal regions 45 that are elastically coupled to external regions 46 by way of flexible arms 48 between the two regions 45, 46. The connectors 43 preferably are coupled to the internal regions 45.

The external region 46 of each spider 41, 42 is coupled to a corresponding surface on a respective spider mount 50, by a suitable means such as adhesive. Alternatively, each spider 41, 42 can be integrally formed with its corresponding mount 50. Each spider mount 50 includes a plurality of housing connectors 52, which align with corresponding housing connectors 52 on the other spider mount 50 as well as on the front cover 30 and back cover 20. Screws 54 can thread through all corresponding housing connectors 52 to couple the back housing 20, front housing 30, and spider mounts 50. When coupled, the front housing 30 and back housing 20 form a housing for the unit 100 that keeps out debris, facilitates mounting of the device 100, and results in acoustic effects that are believed to increase the vibrations generated by the motor and allow the motor to operate at higher power levels than otherwise would be possible.

The yoke 73 is coupled to the internal region 45 of each of the first spider 41 and the second spider 42 by a suitable means such as adhesive. For example, a back surface of the yoke 73 is coupled to the first spider 41, and a front surface of the yoke 73 is coupled to the second spider 42. The spiders 41, 42 thus sandwich the motor 70, and provide an elastic suspension system that allows movement of the motor 70 along a longitudinal axis 1 to create vibration. The spiders 41, 42 can be made, for example, from nylon. As another example, the spiders 41, 42 can be made from nylon plastic with glass reinforcing, to provide tensile strength to the spiders 41, 42 while permitting the spiders 41, 42 to flex.

As discussed above, the spiders 41, 42 are coupled to respective spider mounts 50. Each spider mount 50 has a ring surface 51 that couples to the external regions 46 of the corresponding spider 41, 42. For example, the external regions 46 of the spiders 41, 42 may be adhered to the respective ring surfaces 51. Alternatively, if the spider 41, 42 is integrally formed with its corresponding mount 50, then the ring surface 51 simply defines the outer region 46 of each spider 41, 42. Using the spiders 41, 42, the motor 70 may thus vibrate within, and even slightly beyond, the space defined between the combined ring surfaces 51 of the spider mounts 50. The second spider 42 can also be coupled to the front cover 30 in a manner analogous to that used for the spider mounts 50, i.e., the internal surface of the front cover 30 can have a ringed surface 32 onto which the outwardly-facing external region 46 of the second spider 42 can be attached by a suitable means such as adhesive. As noted above, the front cover 30 can also be coupled to the spider mounts 50 and the back cover 20 via screws 54. Also, as illustrated in FIG. 1B, the spiders mounts 50 can be configured with corresponding tongue-and-groove geometries or similar mechanical engaging shapes, such as pins and recesses or the like, so that each spider mount 50 mechanically engages and locks with the other spider mount 50.

A rear portion 61 of the electromagnetic coil 60 is coupled to the back cover 20, such as with adhesives. A terminal 10 has wires that extend from the front cover 30 and are electrically connected to the electromagnetic coil 60. It will be appreciated, however, that any suitable electrical connector may be used to provide power to the electromagnetic coil 60. The first spider 41 has a central opening 47 through which the electromagnetic coil 60 passes to connect with the back cover 20. As discussed above, the front end 62 of the electromagnetic coil 60 rides within the annular space 74 of the motor 70. The back cover 20 supports the electromagnetic coil 60 assembly and is directly thermally coupled to the electromagnetic coil 60. Additionally, because the back cover 20 is made of thermally conductive metal, it serves as both a heat sink and a radiator for the heat generated by the electromagnetic coil assembly 60. The front cover 30 prevents external objects from getting inside and blocking the vibrating motor 70, but includes a plurality of apertures 34 sized to permit the movement of air into and out of the device 100. The front cover 30 may be made from polycarbonate materials. As noted earlier, the back cover 20 is also coupled to the spider mounts 50 by a suitable means such as screws 54, and may also be coupled to the external region 46 of the first spider 41 by a suitable means such as adhesives.

The following points may be noted in view of the above-described structure of the vibrating unit 100. First, the front cover 30 and the back cover 20 are rigidly connected to each other and the spider mounts 50. Similarly, the external regions 46 of the spiders 41, 42 are rigidly connected to their respective spider mounts 50, and hence are rigidly connected to the front cover 30 and the back cover 20. Similarly, the electromagnetic coil 60 is rigidly connected to the back cover 20 by way of its rear portion 61, and hence the electromagnetic coil 60 is substantially rigidly connected to the spider mounts 50, apart from some slight flex that may be imparted by the back portion 61 due to the mechanical limits of the materials used; this flex can kept to a minimum. The motor 70, on the other hand, is elastically connected to the spider mounts 50 by way of the internal regions 45 of the spiders 41, 42. Hence, whereas the majority of the components of the device 100 are rigidly connected to each other, the motor 70 elastically rides within the spider mounts 50 on the suspension system provided by the spiders 41, 42. The motor 70 and the electromagnetic coil 60 electromagnetically couple with each other to drive the motor 70 to vibrate within the spider mounts 50. Further, during operations, because the back cover 20 is made of a thermally conductive metal, such as aluminum, or any other suitable thermally conductive material, heat generated by the electromagnetic coil 60 is rapidly conducted to the back cover 20 and radiated away, thereby cooling the unit 100. The back cover 20 thus serves to both protect the motor 70 from dust and debris and to keep the unit 100 cool.

The unit 100 is able to accept low power signals to provide the desired vibration; for example, the input power signal may be a low-frequency 2.5 volt sine wave. In preferred embodiments the electromagnetic coil 60 has a D.C. resistance of 4.1 ohms, ±5%. The electromagnetic coil 60 may have a coil with a Kapton bobbin and a kraft belt. The coil may be wound with a single wire that creates 4 layers with, for example, 66 turns on each layer. The electromagnetic coil 60 provides a magnetic force suitable to move the vibrating motor 70.

The vibrating motor 70 employs complete magnetic loops. The electromagnetic coil 60 is positioned such that the magnetic in the longitudinal direction (indicated by the arrow 1) passes through the motor 70. When a signal powers the electromagnetic coil 60, the electromagnetic coil 60 generates a magnetic force on the vibrating motor 70 and moves the vibrating motor 70 in and out along the annular space 74. The spiders 41, 42 hold the vibrating motor 70 and also provide a resilient force to bring the vibrating motor 70 back to an initial position when the signal is gone. The spider mounts 50 hold the spiders 41, 42 as a suspension system and couple to the housing provided by the back 20 and front 30 covers. When a continuous, oscillating signal drives the electromagnetic coil 60, the signal forces the vibrating motor 70 to move back and forth. The spiders 41, 42 pass such movement to the housing formed by the covers 20, 30, and cause the housing to move in the other direction. The housing thereby provides a convenient means for mounting the device 100 whereby vibrations generated by the device 100 can be transferred to the structure surrounding the device 100.

The rapid movements of the vibrating motor 70 also force air in and out of the housing via the apertures or openings 34 in the front cover 30, which causes an additional vibration effect along the longitudinal direction 1. More specifically, the back and forth movement of the vibrating motor 70 within the housing pumps air into and out of the housing via the openings 34. The openings 34 can be sized so that the openings restrict the airflow, thereby causing back-pressure to build up within the housing. The back-pressure is believed to increase the reactive force generated between the vibrating motor 70 and the housing, thereby increasing the overall level of vibration generated by the device 100.

Moreover, it is believed that the back-pressure within the housing helps to dampen or reduce the maximum excursion of the vibrating motor 70 in relation to the electromagnetic coil 60. Thus, the device 100 can operate at relatively high power levels, and can thereby generate higher vibration levels, without damage to the vibrating motor 70, electromagnetic coil 60, or other components caused by excessive excursion of the vibrating motor 70. For example, it is believed that embodiments of the device 100 can operate without damage at a power input of approximately five Watts, while comparable devices without a housing are limited to approximately three Watts of input power, and fail at a power input of approximately five Watts.

The housing formed by the covers 20, 30 also prevents external objects from moving into the unit 100, thereby preventing jamming of the motor 70 while also allowing air to be pumped in and out smoothly, and simultaneously cools the unit 100 via conductive and radiative effects of the back cover 20.

The above-described vibrating device 100 provides a compact, lightweight and energy-efficient source of highly directional vibratory energy, vibrating at about 50 Hz or any low frequency (such as less than 100 Hz) and requiring very low power signals (such as 2.5 Watts at 0.6 amp). Moreover, because of the design of the vibrating motor 70, there is almost no electromagnetic interference with other equipment. As such, the embodiments of the vibrating device 100 are ideally suited for certain environments with requirements of low weight, low power, high power efficiency, and low electromagnetic interference, such as hospitals, aircraft and the like.

A motor substantially similar to the motor 70 constructed and evaluated. In particular, an accelerometer was mounted on the top of the motor, and the motor was operated using an AC (alternating current) voltage input of approximately 3.5 Volt rms (root mean square) at approximately 55 hertz. The maximum vibration generated by the motor was measured by the accelerometer as approximately 7.6 G (unit of acceleration caused by gravity). A conventional motor of comparable size was operated using substantially the same voltage, and an accelerometer mounted on top of the conventional motor measured the maximum vibration level as approximately 6.4 G rms. Thus, the motor constructed in accordance with the inventive concepts disclosed herein was approximately 20 percent more efficient at generating vibrations than the conventional motor.

Figure 4C:
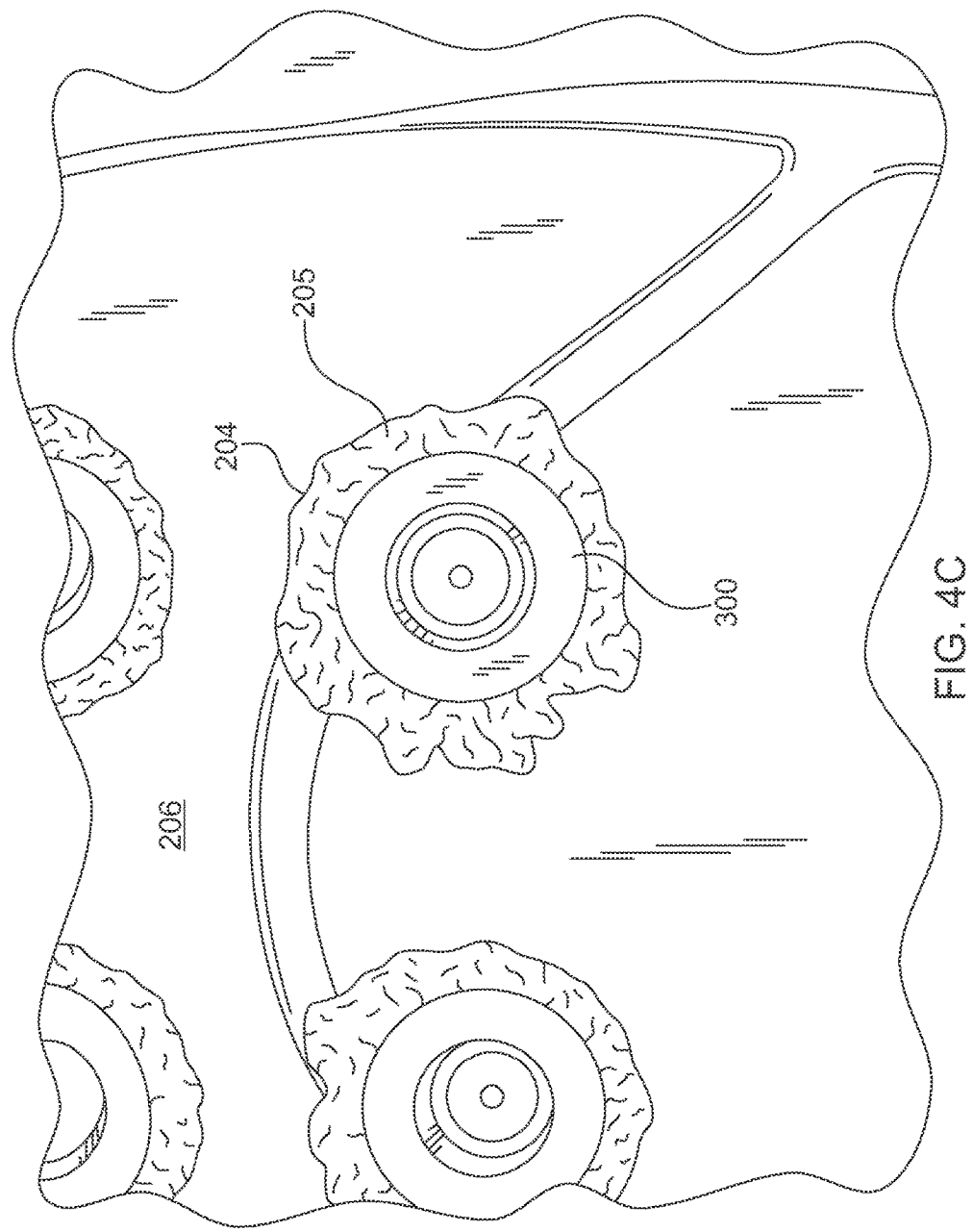
Figure 4D:
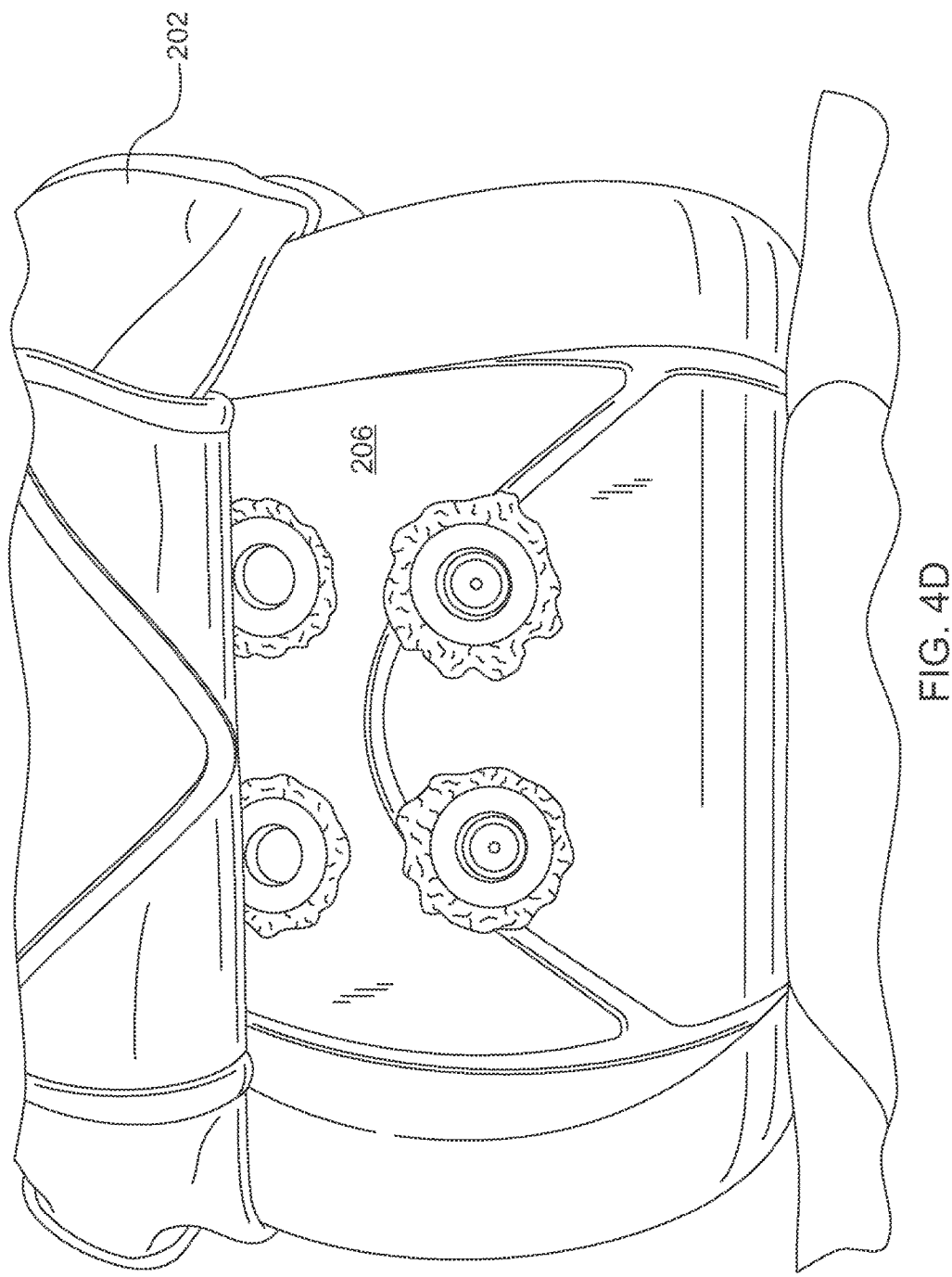
Figure 4E:
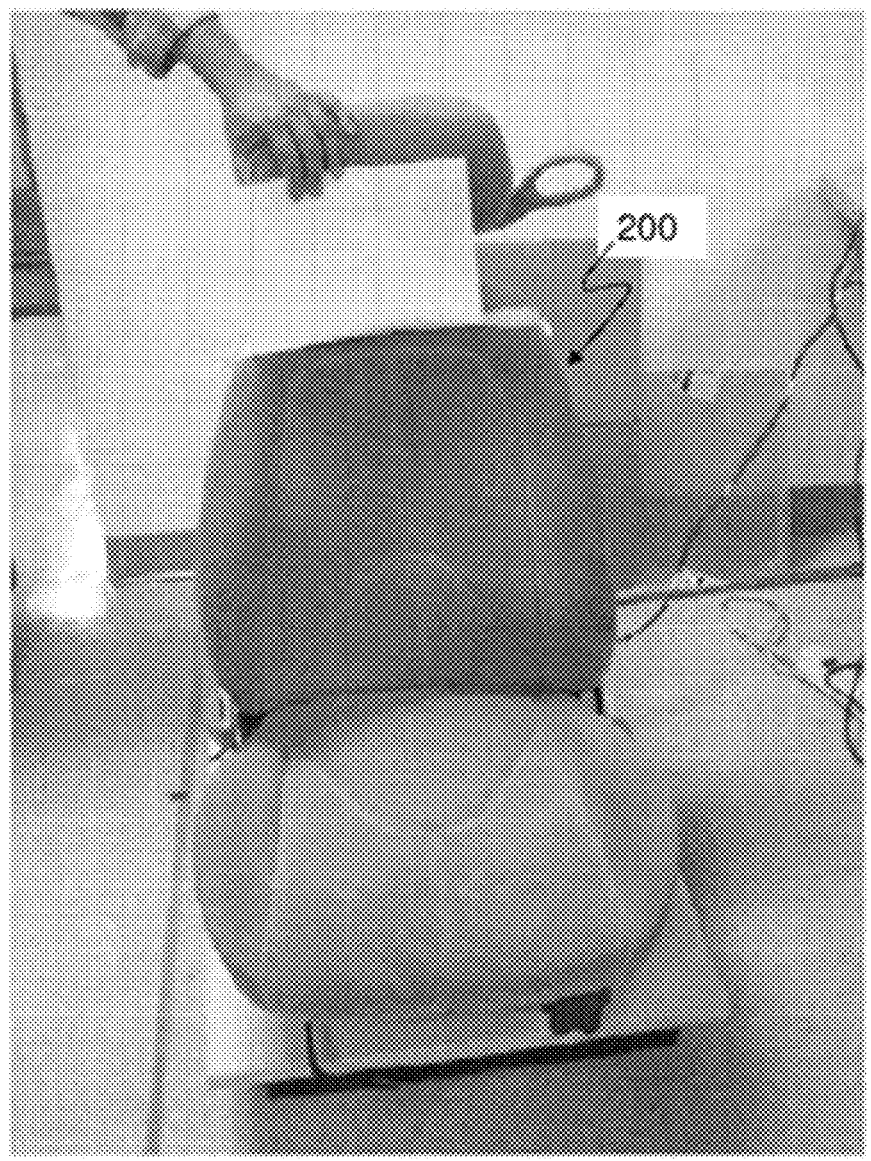

By way of example, FIGS. 4A-4E illustrate the mounting of embodiments of vibrating units 300, similar to the vibrating unit 100, into a chair 200. As shown in FIG. 4A, the cover 202 of the chair 200 may first be removed. A hole 204 may then be cut into the seat cushion 206 of the chair 200 at a location where the vibrating unit 300 is desired. It may be desirable to ensure that the hole 204 is large enough to leave adequate room for the installation of wiring and the insertion of insulating material 205 for the vibrating unit 300. As shown in FIG. 4B, wiring and insulating material 205 may be installed into the hole 204 of the seat cushion 206. As shown in FIG. 4C, the vibrating unit 300 may then be secured within the hole 204 in the seat cushion 206, nestled within the insulation material 205. Finally, as shown in FIG. 4D, the seat cover 202 may be replaced over the seat cushion 206, with a completed seat 200 shown in FIG. 4E.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

What is claimed is:

1. A vibrating device comprising:
   a housing comprising a top portion and a bottom portion, wherein at least one of the portions is formed from a thermally conductive material;
   a magnetic motor comprising:
      a disc-shaped permanent magnet having a diameter and a height;
      a disc-shaped pole piece having a diameter greater than said magnet disposed to cover one pole of said magnet with said magnet centered on and fixed to said pole piece; and
      a cylindrical yoke having a diameter substantially equal to the diameter of said pole piece and a height at least equal to the height of said magnet, the cylindrical yoke fixed to said pole piece so that the cylindrical yoke surrounds said magnet with a gap between the cylindrical yoke and said magnet;
   an elastic suspension system rigidly coupled by an external region to at least one portion of the housing wherein the suspension system comprises at least two spiders comprising an internal region which is elastically coupled to the external region by at least two spaced apart flexible arms, wherein the internal regions of the at least two spiders are coupled together by a circular spacer connector which forms a circular aperture having an inside diameter substantially equivalent to the diameter of said pole piece so that the magnetic motor is inserted through and attached to said spacer connector; and a cylindrical electromagnetic coil mechanically and thermally coupled to a thermally conductive portion of the housing projecting towards the other portion of the housing so that at least a portion of said coil is situated within the gap to electromagnetically couple with the magnetic motor to cause the motor to vibrate within the gap with the elastic suspension system transmitting vibrations to the housing.

2. A unit for generating vibrations, comprising:

a housing having a front surface and a back surface and apertures formed in at least one surface thereof;

a suspension system having a rigid first portion attached to the housing, and an elastic second portion coupled to the first portion;

a motor, the motor mounted on the second portion of the suspension system and comprising:
- a disc-shaped permanent magnet having a diameter and a height;
- a disc-shaped pole piece having a diameter greater than said magnet disposed to cover one pole of said magnet with said magnet centered on and fixed to said pole piece; and
- a cylindrical yoke having a diameter substantially equal to the diameter of said pole piece and a height at least equal to the height of said magnet, the cylindrical yoke fixed to said pole piece so that the cylindrical yoke surrounds said magnet with a gap between the cylindrical yoke and said magnet;

an electromagnetic coil fixed to the housing so that at least a portion of said coil is situated within the gap to electromagnetically couple with the magnetic motor to cause the motor to vibrate within the gap with the first portion of the suspension system transmitting vibrations to the housing and causing air to pass into and out of the housing through the apertures in response to the vibration of the motor such that back-pressure results within the housing.

3. The unit of claim 2, wherein the motor generates vibrations in the form of acoustic pulses.

4. The unit of claim 2, wherein the housing comprises a front cover and a rear cover, the electromagnetic coil is fixed to the rear cover, and the apertures are formed in the front cover.

5. The unit of claim 2, further comprising a mount for the suspension system, wherein the mount is fixed to the first portion of the suspension system and to an inner surface of at least one of a front or rear cover of the housing.

6. The unit of claim 5, wherein the suspension system comprises a spider, the first portion of the suspension system comprises a radially external region of the spider, and the second portion of the suspension system comprises a radially internal region of the spider.

7. The unit of claim 6, wherein the internal surface of the front cover has a ringed surface, and the radially external region of the spider is attached to the ringed surface.

8. The unit of claim 6, wherein the radially internal region of the spider has an opening formed therein, and the electromagnetic coil extends through the opening.

9. The unit of claim 2, wherein at least a portion of the housing is from a thermally-conductive material.

10. The unit of claim 9, wherein the electromagnetic coil is thermally coupled to the thermally conductive portion of the housing so that heat transfer can occur between the electromagnetic coil and the thermally-conductive material.

11. The unit of claim 10, wherein the electromagnetic coil and the housing form part of a thermal circuit that facilitates heat transfer out of the unit.

12. The unit of claim 2, wherein the apertures are sized to restrict air flow.

* * * * *